Oct. 9, 1962
F. MORANDI
3,057,068
SPRING HEAD-CLAMPED HOOK HINGE JOINT FOR
RELEASABLY SECURING ARTIFICIAL TEETH
Filed Oct. 7, 1959
5 Sheets-Sheet 1
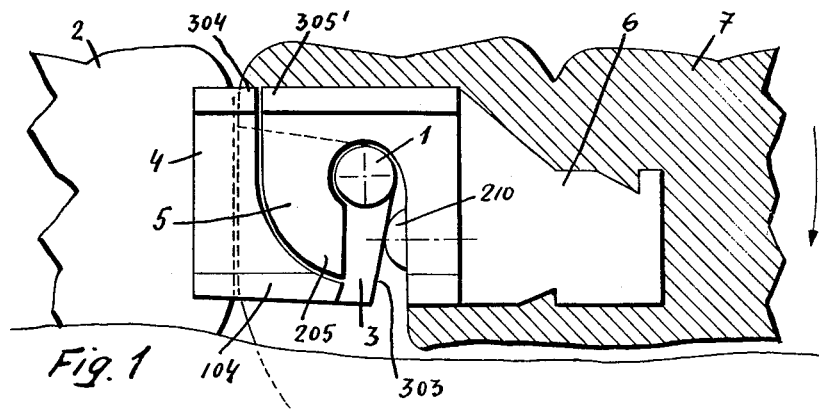
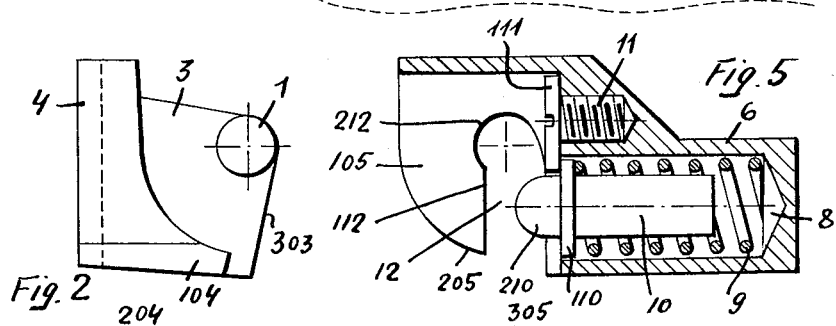
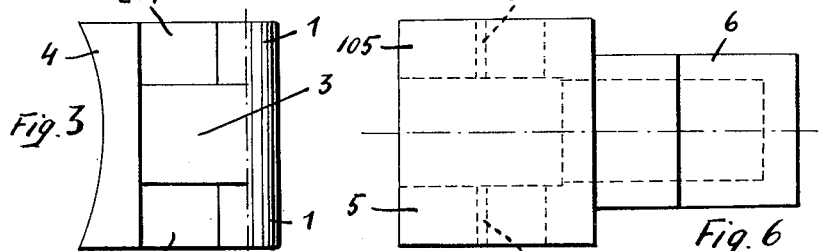
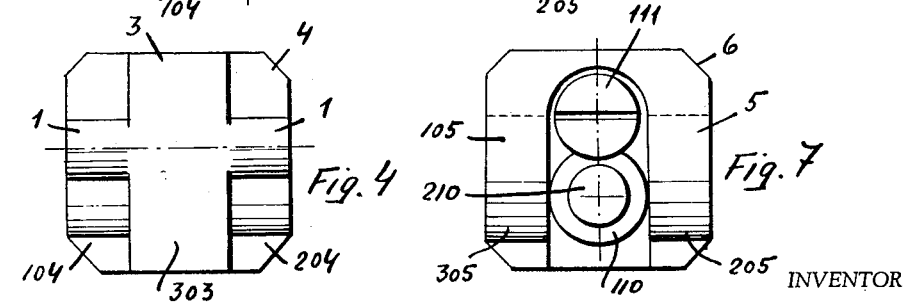
INVENTOR
FEDERICO MORANDI
BY *Imirie & Smiley*
ATTORNEYS

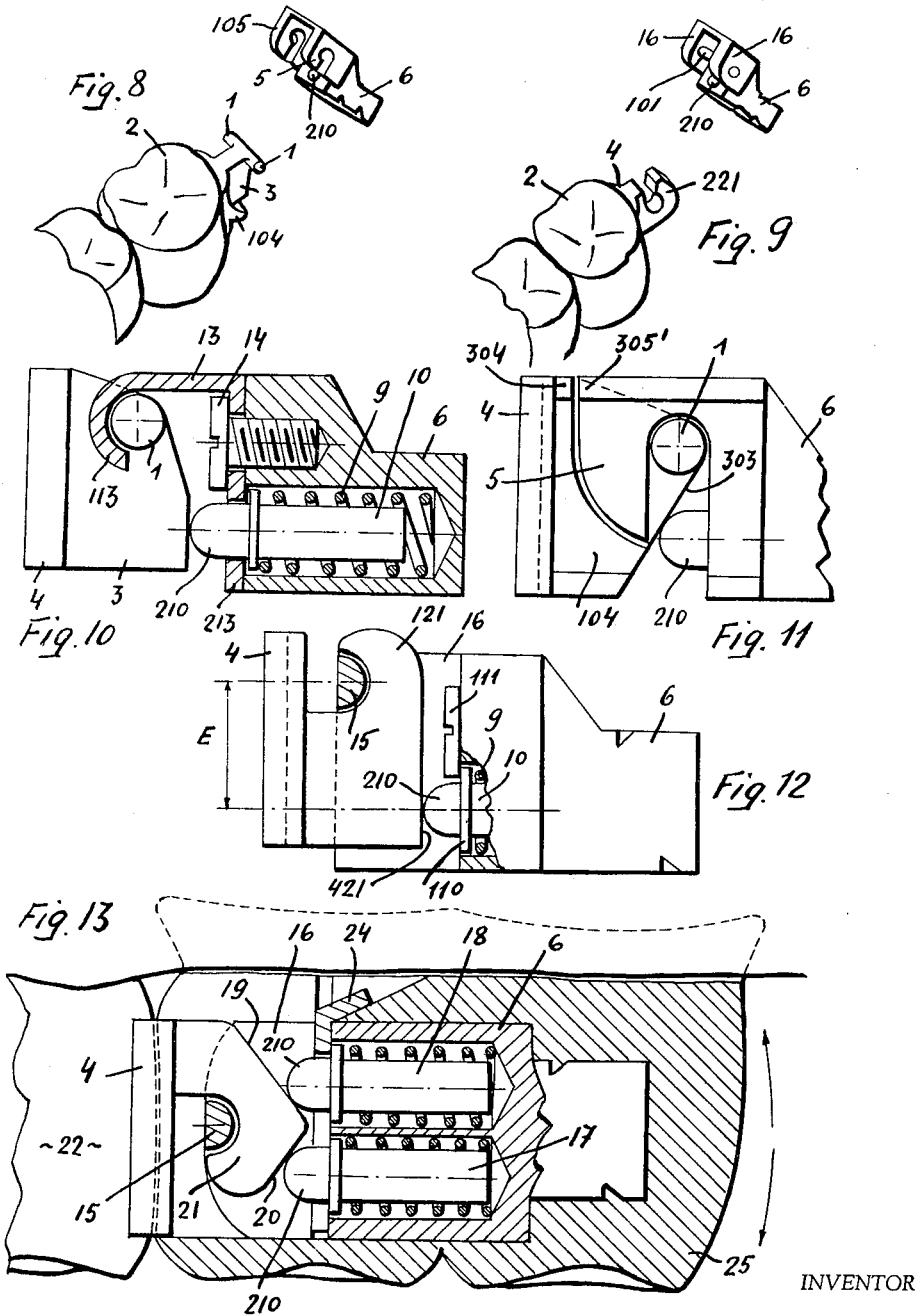

Oct. 9, 1962

F. MORANDI 3,057,068

SPRING HEAD-CLAMPED HOOK HINGE JOINT FOR
RELEASABLY SECURING ARTIFICIAL TEETH

Filed Oct. 7, 1959

INVENTOR

FEDERICO MORANDI

BY *Imrie & Smiley*

ATTORNEYS

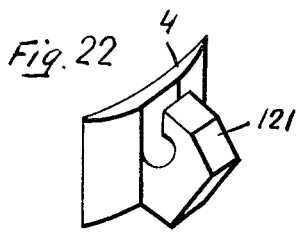
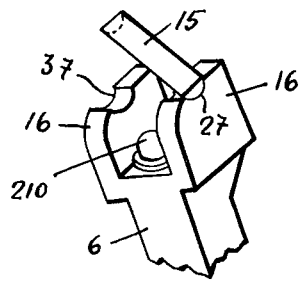
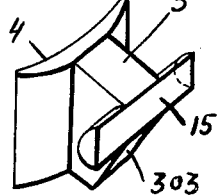
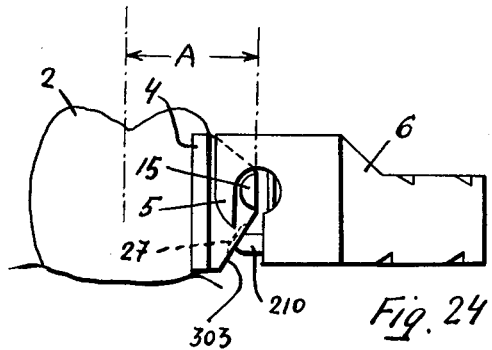
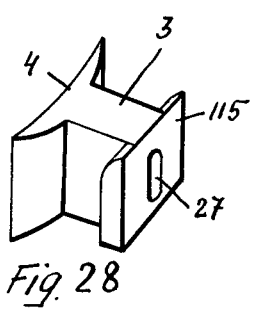
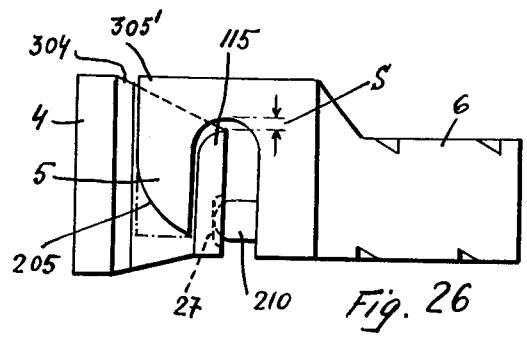
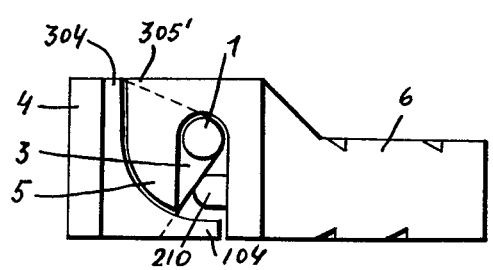

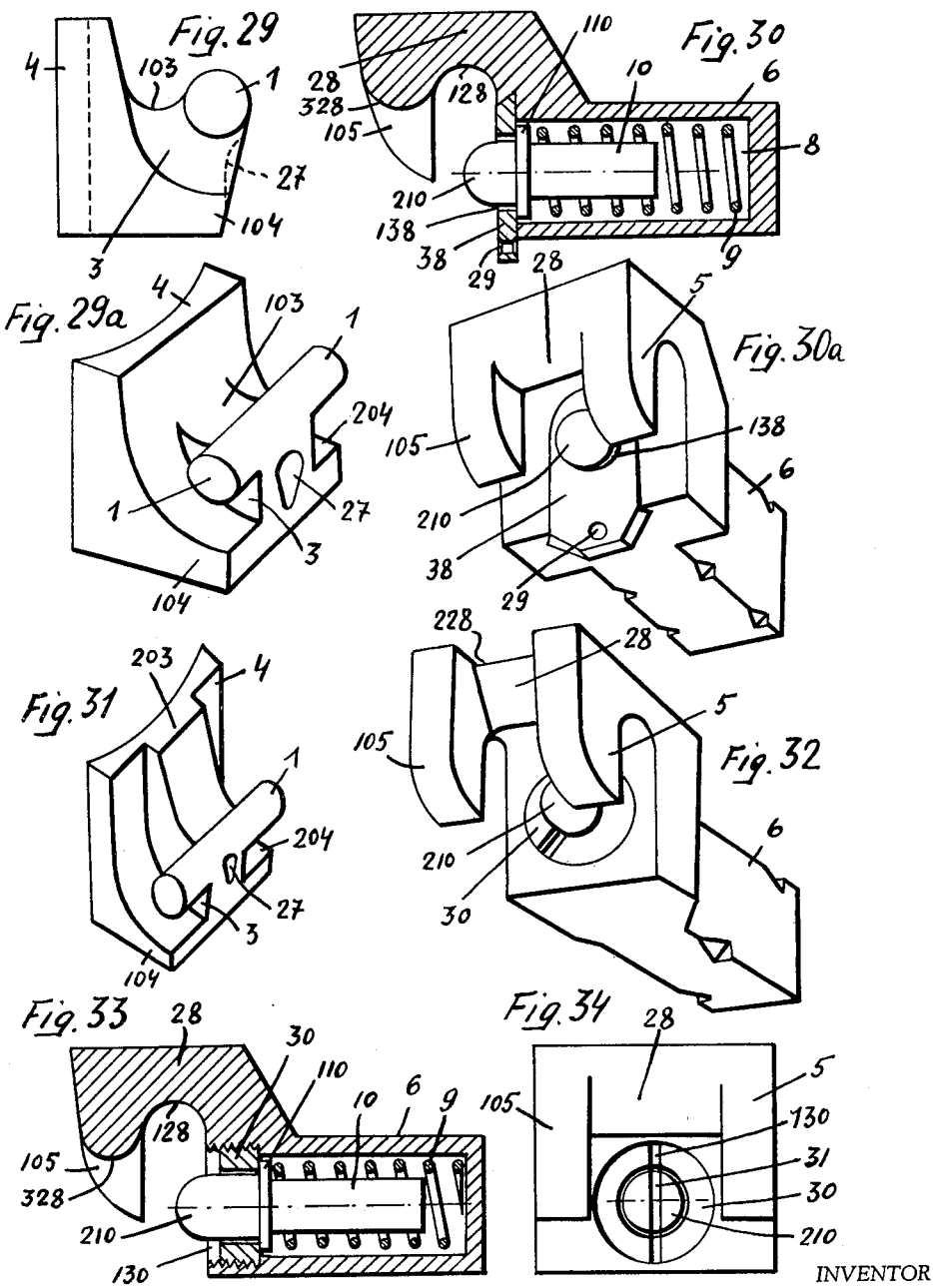

United States Patent Office

3,057,068
Patented Oct. 9, 1962

3,057,068
SPRING HEAD-CLAMPED HOOK HINGE JOINT FOR RELEASABLY SECURING ARTIFICIAL TEETH
Federico Morandi, 47/4 Via Siepelunga, Bologna, Italy
Filed Oct. 7, 1959, Ser. No. 844,946
Claims priority, application Italy Oct. 11, 1958
22 Claims. (Cl. 32—5)

This application is a continuation-in-part of my co-pending application Serial No. 824,381, filed July 1, 1959.

This invention relates to joints for releasably securing artificial teeth and aims to provide a joint of the hook hinge type adapted to hold the artificial denture or prosthesis particularly when fastened at one end, in a pre-determined rest position, possibly detached from the alveolar ridge of the underlying gum, while permitting all masticatory movements.

Another object of the invention is to provide a joint of the kind above-referred to, which permits of easily removing the prosthesis even by the user itself and without the use of special tools, while ensuring at the same time a very good connection with the pillar tooth.

Still another object of the invention is to provide a joint which is adapted for use on free-end prosthesis of the upper jaw.

Other objects and advantages will appear from the following specification taken with reference to the attached drawings, in which:

FIGURE 1 shows a side view partially in section of a free-end dental prosthesis fastened by means of a hinge joint according to the invention;

FIGURES 2, 3 and 4 are a side view, a plan view and a front view of the part of the joint carrying the hinge pin;

FIGURES 5, 6 and 7 are respectively a side view with parts in section, a plan and a front view of the part of the joint carrying the hook-shaped hinge elements;

FIGURE 8 is a perspective view of a dismounted joint of the kind in which the hinge pin is fastened to the pillar tooth;

FIGURE 9 is a perspective view of a dismounted joint, of the kind in which the hook-carrying member is fastened to the pillar tooth;

FIGURE 10 is a side view with parts in section of another embodiment of the hinge-joint according to the invention;

FIGURE 11 shows in side view still another embodiment of the joint;

FIGURES 12 and 13 show in side view with parts in section two further embodiments of the invention, the latter being particularly adapted for upper prostheses having a free end;

FIGURES 22 and 23 show in perspective view a further variation of a hook and pin joint adapted for use in the arrangement according to the invention;

FIGURE 24 shows in side view a variation of the device illustrated in FIGURES 1 to 8 and FIGURE 25 shows in perspective view the pin element fastened to the pillar tooth;

FIGURES 26 and 27 show in side view two further embodiments of the hook joint to be adopted whenever a restricted movement of the prosthesis is desired;

FIGURE 28 shows in perspective view the fixed part of the joint shown in FIGURE 26;

FIGURES 29–29a and 30–30a show in perspective view and in vertical longitudinal section (FIG. 30) the two parts of another embodiment of the invention;

Figure 14:
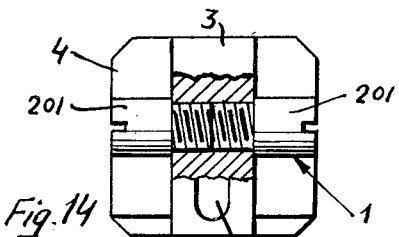
FIGURES 14 and 15 show in front view with parts in section two methods of mounting on a rib a pin projecting on both ends.

FIGURES 31 and 32 show in perspective view a variation of the embodiment shown in FIGURES 29, 29a and 30, 30a; and FIGURES 33 and 34 show in longitudinal vertical section and in front elevation another embodiment of the part of the joint inserted in the prosthesis.

Referring to the drawings, the joint comprises, as usual, an elongated plate 4 adapted to be welded or otherwise secured to the side of the cap of a pillar tooth 2, and a removable part 6 to be embedded into the prosthesis 7.

In the example as shown in FIGURES 1 to 7, the plate 4 carries a rib 3 to which a pin 1 is fastened intermediate its ends, which thus projects on both sides of said rib 3. The plate 4 carries also at its base a pair of abutment wings 104—204, FIGS. 2, 3 and 4, which present arcuate sections formed by arcs of circles concentrical to the axis of pin 1.

The removable part of the joint to be fastened to the prosthesis comprises the hinge members which are complementary to those carried by plate 4 and in the case as shown comprises an elongated shell 6 to be encased in a known manner into the prosthesis 7 and which carries a pair of horizontally spaced parallel hooks 5—105 so arranged as to be hooked, whenever desired, to said projecting parts of the pin 1 carried by the fixed joint part. The hooks are provided with shaped ends 205—305 having straight hook edges 112 and with an arcuate bottom part 212 which forms a hinge eye. Between the inside hook edges and the end of the shell 6 in front of them, there exists a gap 12.

In the shell 6 a substantially cylindrical blind bore 8 is drilled in which a helical spring 9 is inserted on whose outer end an abutment member or collar 110 bears which is fastened to a bolt shank 10 inserted in said spring 9 and provided with a preferably rounded clamp head 210 projecting on the side of said collar 110 lying opposite to spring 9. The parts 9, 10, 110 are held within said shell bore 8 by a screw 11 screwed in a tapped bore formed in said shell 6 parallel to bore 8 and whose large head 111 abuts against the adjoining part of said collar 110, while leaving said clamp head 210 to project freely in the gap 12 between the two hooks 5—105 (cfr. FIGURES 5 and 7), in a position vertically spaced from the said bottom part 212.

The operation of the thus described joint is apparent, particularly by an examination of FIGURE 1 from which it may be seen that by hooking the hook pair 5—105 on the pin 1, the projecting head 210 is resiliently pushed against the downwardly inclined edge 303 of the pin-carrying rib 3 in front of it, thus retaining the part 6 and the prosthesis 7 attached thereto in correct position while avoiding any accidental unhooking. It may be mentioned also that, even in case of bending or breakage of the pin 1, the outer edges 205 of the hooks find a convenient seat on the curved edges of the abutment wings 104—204.

As may be seen from FIGURES 8 and 9, instead of attaching a transversal pin 1 to a part fastened to a pillar tooth 2, and providing a pair of hooks 5 on the shell 6 to be fastened to the prosthesis (FIG. 8), it is also possible to attach a hook 221 to the pillar tooth 2 (FIG. 9) and mount a pin 101 between two lugs 16 fitted to the said shell 6 to be fastened to the prosthesis.

In FIGURE 10 another constructive form of removable hook-carrying part is shown: According to this form the hooks 113 are formed at the end of a part 13 projecting out of a plate 213 adapted to be attached as by screw 14 to the part 6 and provided with an aperture through which the spring bolt clamp head 210 projects.

FIGURE 11 shows another constructive form of a hook-hinge joint, in which the hook 5 may have even straight walls, provided the hooked part of the joint be pulled in a direction opposite to the gum by co-action of spring bolt clamp head 210 with an inclined surface of the edge 303 of the pin-carrying rib 3.

FIGURE 12 shows a further constructive form of hook-hinge joint, in which a single hook 121 formed at the upper part of an extended rib 221 is fastened to the plate 4 to be attached to the pillar tooth (not shown) and the preferably semi-cylindrical hinge pin 15 to which the hook may be hooked, is attached between a pair of horizontally spaced lugs 16 (only one of which is shown). The clamping head 210 abuts in this case against a part of the hook-carrying rib 421 well spaced by a distance E from the axis of the pin 15, thus giving great stability to the joint.

In the above embodiment the part 4 is welded to the cap of a tooth with the mouth or concave part of the hook directed towards the base or open end of the said cap.

In all the above embodiments the prosthesis, while it is compressed against the gum during the mastication, it is immediately brought to its rest position, in which it is detached from or adheres, without substantial pressure, to the underlying gum, by the action of the described spring clamp means carried by the shell embedded in the prosthesis and bearing against the part of the joint carried by the pillar tooth.

FIGURE 13 shows another variation of the embodiment shown in FIGURE 12: Here the hook 21 which is also attached to the pillar tooth (which in this case is shown as an upper-jaw tooth) has its mouth or concave part opening towards the crown end (in this case the bottom end) of the pillar tooth cap 22 and is so arranged as to permit hooking a complementary joint part comprising a horizontal hinge pin 15 fastened to a pair of lugs 16 projecting out of a shell 6 inserted in a prosthesis 25, preferably of free-end upper-jaw type, as shown.

The rear edges 19 and 20 of the hook 21 are equally inclined with respect to the horizontal plane passing through the axis of the pin 15 and at right angles to the hook-fastening plate 4 and in the said shell 6 a pair of parallel spring-pressed bolts 17—18 provided with projecting clamping heads 210 are mounted and retained as by a forked plate 24 provided with a grip and through which the heads of said clamping members project so as to abut against the inclined back 19 and 20 of said hook 21 and resiliently hold the prosthesis 25 in correct position and bring same to this position each time the mastication pressure has ceased.

Figure 15:
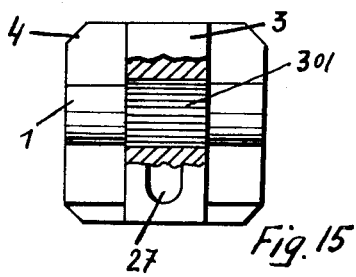

FIGURES 14 and 15 illustrate two manners of mounting the pins projecting by both their ends out of a central rib 3:

According to FIGURE 14, the rib 3 has a screw-threaded bore and the projecting ends 201 of the pin 1 constitute the head portions of two screws screwed into said threaded bore from opposite ends.

According to FIGURE 15, the said rib 3 has an axially indentated bore and the pin 1 projecting by both its ends has an intermediate toothed part 301 of greater diameter of its ends and which is forced into the said indentated bore.

Figure 16:
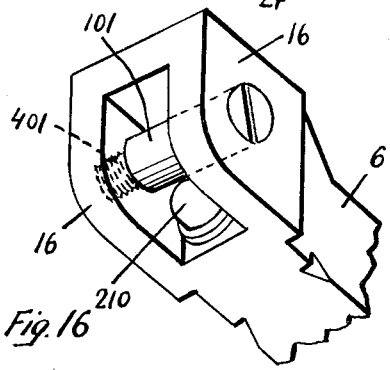
FIGURE 16 shows in perspective view how a pin may be mounted between a pair of lugs.

FIG. 16 shows one of the manners in which the pin 101 is mounted between the lugs 16 projecting from a shell 6 to be encased in a prosthesis: One of the lugs has an unthreaded bore and the opposite lug has a corresponding threaded bore. The pin has a diameter which is equal to the diameter of the said unthreaded bore and has a threaded end 401 adapted to be screwed into the said threaded bore: The mounting is effected by simply screwing the threaded pin part 401 into the corresponding threaded bore in one of the lugs.

Figure 17:
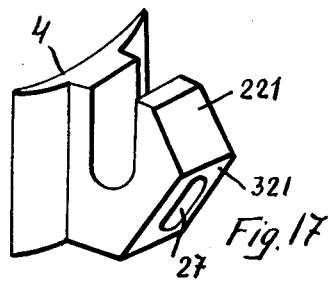
FIGURES 17 shows a particular form of hook to be fastened to a pillar tooth.

In FIGURE 17 a vertical hook 221 is shown which is fastened to the fixed plate 4 and is particularly adapted for co-acting with the joint element shown in FIGURE 16. In this embodiment, the hook 221 has a downwardly inclined face 321 provided with a recess 27 adapted to receive the clamp head 210 protruding between the lugs 16 of the element shown in FIGURE 16.

Figure 18:
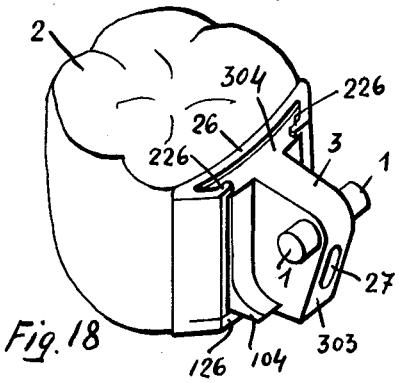
FIGURES 18 to 20 show in perspective view three attachments for a prosthesis mounted on the pillar tooth by means of a slidable joint.
Figure 19:
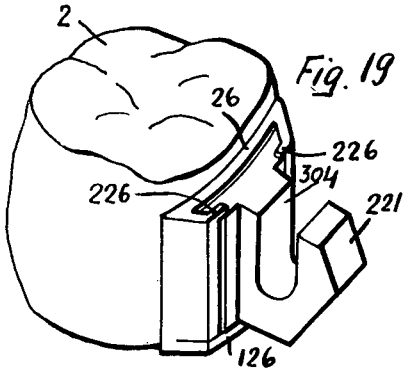
Figure 21:
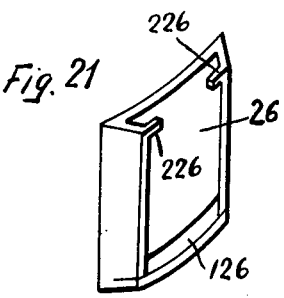
FIGURE 21 show the part of the sliding joint to be attached to the pillar tooth.
Figure 20:
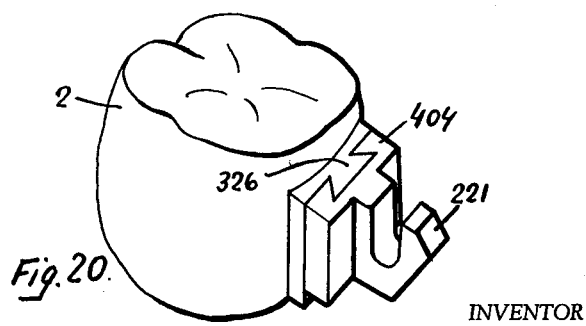

FIGURES 18, 19 and 20 show how the member to be attached to the pillar tooth 2 may be rendered dismountable.

In the embodiment shown in FIGURE 18, the rib 3 carrying the pin 1 and in FIGURE 19, the hook 221 are attached to a plate 304 adapted to be inserted in a frame-like plate 26 having a pair of inwardly inclined side flanges which form a pair of guide grooves for the longitudinal edges of said plate 304. The frame is provided with a bottom flange 126 against which bears the bottom edge of said plate 304 and with a pair of small lugs 226 projecting from the upper corners of the said side flanges and which may be bent inwardly above the top edge of the plate 304, when it is desired to lock same into the frame 26, as clearly shown in FIGURES 18 and 19.

According to FIGURE 20, to the pillar tooth 2 a projecting dovetail joint element 326 is fastened, to which a dovetail-grooved plate 404 carrying a joint element such as the hook 221, may be coupled.

In FIGURE 22 the plate 4 to be fastened to the pillar tooth carries a hook 121 having a narrow insertion mouth and a substantially cylindrical recess. In this hook a semi-cylindrical pin 15, FIGURE 23, may be inserted. This pin, as shown in FIGURE 23, is welded into a pair of corresponding semi-cylindrical grooves 27—37 formed on the edges of a pair of lugs 16.

In FIGURES 24 and 25 a joint is shown in which the semi-cylindrical pin 15 is fastened to or made in one piece with the vertical rib 3 provided with a strongly inwardly inclined edge 303 against which reacts the clamp head 210 carried by the hooked member 5 fastened to the shell 6 to be embedded in the prosthesis. For better stability, the said clamp head may project into a recess 27 formed in the edge 303.

Both these embodiments are designed so as to reduce to a minimum the eccentricity A, FIGURE 24, between the axis of the pin 15 and the median transversal vertical plane of the pillar tooth 2.

Whenever it is desired to limit the vertical swinging movements of the prosthesis, instead of a pin, a small vertical transversal flat bar 115, FIG. 28, may be fastened to the vertical rib 3 carried by plate 4, while the hook 5 has substantially straight outer and inner walls. A limited swinging away from the gums (clockwise direction in FIGURE 26) is permitted by the curved hook part 205, while the swinging in opposite direction is limited by the co-action of the straight opposite parts 304 and 305'. A gap S, FIG. 26, between the top edge of bar 115 and the bottom of the hook 5 may be provided by milling a recess 27 at a suitable height in the front of bar 115, in correspondence of the clamping head 210 of the other joint member.

A like effect of limited upwardly swinging may be obtained, as shown in FIGURE 27, by forming the opposite straight parts 304 and 305' on joint members in which the pin 1 is so arranged on the rib 3, which acts at the same time with its lower inwardly inclined edge as abutment member for the clamping head 210, as to provide a very narrow play between the joint parts. The limited downwardly swinging is obtained by providing a forwardly extending tail piece 14 against which may abut the opposite bottom part of the hook 5.

FIGURES 29, 29a and 30, 30a show the parts of a reinforced joint, by which the pin 1 is fastened at the top of its rib 3 which is provided upwardly with a curved hollow bearing surface 103 against which may abut the corresponding convex edge 28 of a bridge piece 28 between the two parallel hooks 105. This bridge piece, in its turn, presents a hollow part 128 in line with the bottoms of the said hooks and which bears on the upwardly projecting middle portion of the pin 1.

FIGURES 30 and 30a show also an improved mounting of the spring bolt 10 which is retained in the blind bore 8 of the shell 6 by a sluice plate 28 whose edge may be slid in correspondingly shaped grooves of the front part of the shell 6. The plate 38 is provided with a bore 138 through which the head 210 of the bolt 10 is allowed to project, the bolt being retained by the collar 110 abutting against the inner edges of bore 138.

The bolt head 210 thus acts also as retaining member of the plate 38, which may be slid off only after in-pressing the said head into the bore 8. The plate 38 is provided at its outer edge with a hole 29 which serves for hooking a grip tool.

Another method of mounting the bolt 10 is shown in FIGURES 33 and 34 and consists in providing a short outwardly threaded tubular member or washer 30 provided with radial slits 130 at its front end and screwed in corresponding threads formed at the outer end of the blind bore of the shell 6. If it is desired to use for mounting and dismounting a usual screw driver, a radial slit 31, FIG. 34, may be formed also in the bolt head 210. The bore of the member 30 is such as to permit the passage of the head 210, but not of the collar 110.

FIGURE 31 shows a variation of the pin-carrying member described particularly with reference to FIGURE 29a and consist in providing an upward extension 203 of the pin-carrying rib 3, and in providing a recess 228 in the bridge piece 28 between the hooks 5—105 into which may snugly pass by the swinging movements of the prosthesis the said rib extension 203. In this manner the lateral oscillations of the prosthesis are restrained.

From the foregoing, it is apparent that many variations are possible in the constructions as described and shown, though remaining within the limits of the invention. Thus, instead of the spring-pressed bolts provided with a projecting clamping head, spring-pressed balls or other clamping members may be provided, it being also possible to employ blade springs or even resilient blocks instead of helical springs.

In any case, however, due to the presence of the spring clamp means reacting against the joint part carried by the pillar tooth, and to other means described, the joint never adheres with substantial pressure against the gum, except during the mastication, and thus avoids that the gum remain always under compression, which is a grave inconvenience of other conventional joints, which thus favorize the atrophization of the edentulous gums.

Furthermore, as it is apparent from the examination of the various constructive forms, it is possible to construct joints having a limited possibility of movement in any desired direction or joints which are particularly reinforced, in correspondence of their hinged parts, as required by the fitting in some teeth section which are subjected to heavy repeated mastication pressure.

I claim:

1. A connection assembly for connecting a prosthesis to a pillar tooth comprising a first member for connection to a pillar tooth, a second member for permanent connection to a prosthesis, complemental means on said members for connecting said members together for limited pivotal movement relative to each other, said means including at least one hook on one member and at least a hookable element on the other member, and resilient means projecting from one of said members towards the other said member and resiliently engaging at least one opposing surface of said other member so as to urge said hook against said hookable element and urge the said prosthesis to a correct position with respect to the said pillar tooth, said hookable element-carrying member being fastened between its ends to a rib protruding from a plate adapted to be fastened to a tooth cap and the hook-carrying member including an elongated shell adapted to be embedded in a dental prosthesis, a pair of horizontally spaced hooks protruding from a part of the free end of said hook-carrying member, and said resilient means including a spring clamp member protruding therefrom between said hooks, but in a position vertically spaced from the hinge axis of the assembly, the whole being so arranged that when the said hooks are hooked to the said hookable elements, the spring clamp member resiliently abuts against a corresponding edge of the said rib.

2. A connection assembly for connecting a prosthesis to a pillar tooth comprising a first member for connection to a pillar tooth, a second member for permanent connection to a prosthesis, complemental means on said members for connecting said members together for limited pivotal movement relative to each other, said means including at least one hook on one member and at least a hookable element on the other member, and resilient means projecting from one of said members towards the other said member and resiliently engaging at least one opposing surface of said other member so as to urge said hook against said hookable element and urge the said prosthesis to a correct position with respect to the said pillar tooth, said hook-carrying member being fastened to a plate adapted to be fastened to a tooth cap, the hook of the said member being provided with a rib-like extension; and the other member comprising an elongated shell adapted to be inserted in a dental prosthesis; a pair of horizontally spaced lugs protruding from the free end of said other member, a pin constituting the hookable element and bridging said pair of lugs, and said resilient means including a spring clamp member vertically spaced from said pin and protruding from the free end of said pin-carrying member; the whole being so arranged that when the said hook is hooked to the said pin, the said spring-clamp member resiliently abuts against said rib-like extension of said hook.

3. A connection assembly for connecting a prosthesis to a pillar tooth comprising a first member for connection to a pillar tooth, a second member for permanent connection to a prosthesis, complemental means on said members for connecting said members together for limited pivotal movement relative to each other, said means including at least one hook on one member and at least a hookable element on the other member, and resilient means projecting from one of said members towards the other said member and resiliently engaging at least one opposing surface of said other member so as to urge said hook against said hookable element and urge the said prosthesis to a correct position with repect to the said pillar tooth, said hook-carrying element being fastened to a plate adapted to be welded to a tooth cap, the hook of the said member being provided with a back edge divergingly sloping on both sides from a position intermediate its ends and the hookable element comprising a shell having an elongated form adapted to be embedded in a dental prosthesis; a pair of horizontally spaced lugs protruding from the free end of said hookable element, a horizontal pin bridging said pair of lugs, and said resilient means including a pair of spring clamp members both slidably mounted on a plane at right angles to the axis of said pin and arranged on both sides of the plane passing through said pin axis and disposed at right angles to the first-named plane, said spring-clamp members protruding from said pin-carrying element, the whole being so arranged that when the said hook is hooked to said pin, each of the said spring clamp members of the pair resiliently abuts against one of the said divergingly sloping back sides of said hook.

4. A hook hinge joint comprising in combination an elongated plate adapted to be fastened vertically to the cap of a pillar tooth; a rib extending at right angles to said plate and longitudinally thereof; a small transversal bar fastened intermediate its ends transversally in proximity of one of the ends of said rib so as to form a pair of opposite hookable members having free ends; an elongated shell adapted to be inserted in one end of a prosthesis and having a longitudinal blind hole; and a bolt slidably mounted in said blind hole and provided with a clamp head projecting out of said hole, a spring urging said bolt out of said hole; means for retaining said bolt so as to allow only the said clamp head to project outside of said shell; a pair of horizontally spaced hooks on said shell and engaged on said bar, said hooks being arranged with their bottom parts in a plane vertically spaced from said clamp head; said head and bar-carrying rib being so arranged that when the said hooks are hooked to the said opposite hookable members, the said clamp head resiliently abuts against a part projecting from the said plate fastened to the pillar tooth, in a position which is vertically spaced from the horizontal plane passing through the center of said bar.

5. A hook hinge joint according to claim 4, in which the said transversal bar has at least in part a substantially circular profile and acts as a hinge pin.

6. A hook hinge joint according to claim 4, in which the hook interior has straight edges and the said transversal bar has a flat shape and is attached to said rib with its edges in vertical direction, the whole being so arranged that when the hooks are hooked to said flat bar, their swinging movement is limited.

7. A hook hinge joint according to claim 4, in which the hook interior has straight edges and the said transversal bar has a flat shape and is attached to the said rib with its plane disposed vertically; a recess formed in the outer central portion of said bar in correspondence of the vertical middle plane thereof, the whole being so arranged that when the hooks are hooked to said flat bar, the clamping head protruding between the said hooks projects into said recess of the flat bar and the swinging movement of the two joint elements is limited in both vertical directions.

8. A hook hinge joint according to claim 4, in which the said bolt comprises a stem provided with a rounded end constituting the said clamp head; a protruding abutment member on the stem under said clamp head, a helical spring on the stem part of said bolt opposite to said head and a removable abutment member fitted at the open end of said blind hole and abutting against a part of said protruding abutment member of said bolt and retaining the said bolt stem in said blind hole while permitting its head to project thereout.

9. A hook hinge joint according to claim 4, in which the said bolt comprises a stem provided with a rounded end constituting the said clamp head; a protruding abutment collar on said stem, under the said clamp head, a helical spring on said stem, abutting against said collar and against the bottom of the blind hole in which said bolt is mounted, a tapped hole substantially parallel to the blind hole of said shell and a screw provided with a large head screwed into said tapped hole and abutting with part of its head against the said abutment collar, so as to retain said bolt stem and spring in said blind hole while permitting, of said clamping head projecting thereout.

10. A hook hinge joint according to claim 4, in which the said bolt comprises a stem provided with a rounded end constituting the said clamping head; a protruding abutment member on said stem, under the said clamp head; a helical spring on said stem abutting against said protruding abutment member and against the bottom of said blind hole in which said stem is slidably mounted, a pair of slide slots at the open end of said blind hole and a sluice-like plate provided with a central through hole adapted to permit the passage of the clamping head but not of its underlying abutment member, said hole being drilled in such a position that when the sluice plate is fully inserted in said slide slots, after the said clamping head has been maintained beneath it, it snaps into and through the said plate hole and projects in part thereout.

11. A hook hinge joint according to claim 4, in which the said bolt comprises a stem provided with a rounded end constituting the said clamp head; a protruding abutment member on the said stem, under said clamping head, a helical spring on said stem, abutting against said abutment and against the bottom of said blind hole in which said stem is inserted; a screw tapping at the open end of said blind hole and an outwardly screw-threaded washer-like member screwed in said screw tapping, the hole of said washer being of such diameter as to permit the passage of the clamping head but not of the underlying abutment member, and means on said washer for permitting its screwing and unscrewing.

12. A hook hinge joint according to claim 4, in which the bolt retaining means comprises a centrally perforated plate from which the said hooks project substantially at right angles; said bolt comprising a stem, a rounded head projectable through the perforation in said plate and a radially projecting abutment member between the stem and the head and abutable against said plate, a helical spring mounted on said bolt stem and abutting against the blind hole bottom and the said abutment on said stem and means fastening said hook-carrying plate to said shell with its perforation axially aligned with said blind hole.

13. A hook hinge joint according to claim 4, in which the plate to be fastened to the pillar tooth has at both sides of its pin-carrying rib a pair of wings with concave edges while the hooks attached to the other part of the joint have outer convex edges adapted to rotatably seat on said concave edges.

14. A hook hinge joint according to claim 4, in which the pin forming part of one of the joint elements, is fastened to the top of the said rib attached to the said plate and said rib is provided with a concave top edge and an inwardly inclined lower edge, while the hooks on the other joint element are provided with a concave abutment surface and with a bridge piece between the two hooks.

15. A hook hinge joint according to claim 4, in which the pin-carrying rib forming part of one of the two joint elements, is provided with a projecting part on the sides of which may be guided the hooks carried by the other joint element.

16. A hook hinge joint according to claim 4, in which the plate forming part of one of the joint elements is attached to a cap of a pillar tooth by welding.

17. A hook hinge joint according to claim 4, in which the plate forming part of one of the joint elements is provided with a sliding joint element, adapted to be connected to a mating joint element welded to a cap adapted for capping a pillar tooth.

18. A hook hinge joint comprising in combination an elongated plate adapted to be welded vertically and in a longitudinal direction to the cap of a pillar tooth; a rib extending at right angles to said plate and longitudinally thereof; a hook formed at one end of said rib; an elongated shell adapted to be inserted in one end of a prosthesis and having a longitudinal blind hole; a bolt provided with a clamping head and an abutment member under said head slidably mounted in said blind hole; a spring urging said bolt out of said hole and means co-acting with said abutment member for retaining said bolt so as to allow only said clamping head to project outside of said shell; a pair of horizontally spaced lugs and a horizontal pin engaging the hook and attached by its ends to said spaced lugs in a position vertically spaced from said projecting clamping heads; the said clamping head and hook-carrying rib being so arranged that when said hook is hooked to said pin, the said head resiliently abuts against the edge of said hook-carrying rib, in a position which is vertically spaced from the horizontal plane passing through said pin.

19. A hook hinge joint according to claim 18, in which the said plate is welded to said tooth cap with the mouth of the hook directed towards the base or open end of said cap.

20. A hook hinge joint comprising in combination an elongated plate adapted to be welded vertically and in a longitudinal direction to the cap of the pillar tooth; a hook protruding from an end position of said plate towards its opposite end, the centre of the hook lying approximately between the ends of said elongated plate; said hook being provided with a back edge divergingly sloping on both sides from its centre portion; an elongated shell adapted to be inserted in one end of a prosthesis and having a pair of vertically spaced parallel blind holes; a pair of bolts each bolt of the pair being provided with a clamping head and an abutment member under said head and being slidably mounted in one of said blind holes, a spring urging each of said bolts out of its hole and means co-acting with said abutment member of each of said bolts for retaining both said bolts and for allowing only said clamping heads to project outside of said shell; a pair of horizontally spaced lugs and a horizontal pin engaging said hook and attached by its ends to said spaced lugs in a position between the horizontal planes passing through the axes of said bolts; the said bolts and back edge of the said hook being so arranged that when the said hook is hooked to said pin, each of said clamping heads resiliently abuts against one of said diverging back edges of said hook.

21. A hook hinge joint according to claim 20, in which the said plate is welded to said tooth cap with the mouth of the hook directed towards the crown or top end of said cap.

22. A hook hinge joint according to claim 20, in which the said pin is half-cylindrical in cross section.

References Cited in the file of this patent

UNITED STATES PATENTS

| | | |
|---|---|---|
| 2,347,340 | Smallen | Apr. 25, 1944 |
| 2,748,480 | Weissman | June 5, 1956 |

FOREIGN PATENTS

| | | |
|---|---|---|
| 540,628 | Italy | Mar. 12, 1956 |